United States Patent
Ulupinar et al.

(10) Patent No.: US 9,332,582 B2
(45) Date of Patent: May 3, 2016

(54) SYSTEM, APPARATUS AND METHOD FOR COORDINATING PEER COMMUNICATION IN WIRELESS SYSTEMS

(75) Inventors: Fatih Ulupinar, San Diego, CA (US); Xiaolong Huang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/096,636

(22) Filed: Apr. 28, 2011

(65) Prior Publication Data

US 2011/0270994 A1    Nov. 3, 2011

Related U.S. Application Data

(60) Provisional application No. 61/330,246, filed on Apr. 30, 2010.

(51) Int. Cl.
*H04W 76/02* (2009.01)
*H04W 88/18* (2009.01)
*H04W 92/20* (2009.01)

(52) U.S. Cl.
CPC .......... *H04W 76/025* (2013.01); *H04W 88/182* (2013.01); *H04W 92/20* (2013.01)

(58) Field of Classification Search
CPC . H04W 76/026; H04W 88/182; H04W 92/20; H04W 76/025
USPC .......................... 709/227, 203, 225, 226, 239
See application file for complete search history.

(56) References Cited

U.S. PATENT DOCUMENTS

| | | | | |
|---|---|---|---|---|
| 7,792,130 | B2* | 9/2010 | Fischer | 370/412 |
| 8,089,936 | B2* | 1/2012 | Watanabe | 370/331 |
| 8,418,183 | B2* | 4/2013 | Nishimura | 718/104 |
| 2009/0042597 | A1* | 2/2009 | Yuuki | 455/525 |
| 2009/0052420 | A1* | 2/2009 | Fischer | 370/338 |
| 2010/0035617 | A1* | 2/2010 | Whinnett | 455/436 |
| 2010/0202410 | A1* | 8/2010 | Watanabe et al. | 370/331 |
| 2011/0044279 | A1* | 2/2011 | Johansson et al. | 370/329 |
| 2012/0207078 | A1* | 8/2012 | Hwang et al. | 370/315 |

FOREIGN PATENT DOCUMENTS

| | | |
|---|---|---|
| CN | 101031134 A | 9/2007 |
| CN | 101237663 A | 8/2008 |
| CN | 101674559 A | 3/2010 |
| EP | 2154931 A2 | 2/2010 |
| JP | 2010045782 A | 2/2010 |

(Continued)

OTHER PUBLICATIONS

Qualcomm Europe, T-Mobile, "Discovery of neighbor eNB IP address", 3GPP TSG-RAN WG3 #61, Aug. 22, 2008 p. 1-6.*

(Continued)

*Primary Examiner* — Anthony Mejia
*Assistant Examiner* — Joseph M Cousins
(74) *Attorney, Agent, or Firm* — Ke Liu

(57) ABSTRACT

In accordance with aspects of the disclosure, a method, apparatus, and computer program product are provided for wireless communication. The method, apparatus, and computer program product may be configured to provide a first peer connection with a first node, provide a second peer connection with a second node, and coordinate communication between the first and second nodes via the first and second peer connections.

36 Claims, 12 Drawing Sheets

(56) References Cited

FOREIGN PATENT DOCUMENTS

| JP | 2012506202 A | 3/2012 |
|---|---|---|
| WO | WO-2009066337 A1 | 5/2009 |
| WO | 2010047647 A1 | 4/2010 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP Standard; 3GPP TS 36.300, 3rd Generation Partnership Project (3GPP), Mobile Competence Centre ; 650, Route Des Lucioles; F-06921 Sophia-Antipolis Cedex ; France, No. V9.3.0, Apr. 27, 2010, pp. 1-166, XP050441450, [retrieved on Apr. 27, 2010].

3rd Generation Partnership Project; Technical Specification Group Radio Access Network; Evolved Universal Terrestrial Radio Access Network (E-UTRAN); 51 Application Protocol (S1AP) (Release 9), 3GPP Standard; 3GPP TS 36.413, 3rd Generation Partnership Project (3GPP), Mobile Competence Centre ; 650, Route Des Lucioles ; F-06921 Sophia-Antipolis Cedex ; France, No. V9.2.2, Apr. 21, 2010, pp. 1-244, XP050402573, [retrieved on Apr. 21, 2010].

Alcatel-Lucent et al., "IP address retrieval for ANRF", 3GPP Draft; R3-090540_IPGRAMMAR, 3rd Generation Partnership Project (3GPP), Mobile Competence Centre; 650, Route Des Lucioles; F-06921 Sophia-Antipolis Cedex; France, no. Athens, Greece; Feb. 11, 2009, XP050325285, [retrieved on Feb. 11, 2009].

Ericsson et al., "Stage-2 description of relaying into 36.300", 3GPP Draft; R2-102659_CR_36300_Relaying, 3rd Generation Partnership Project (3GPP), Mobile Competence Centre; 650, Route Des Lucioles; F-06921 Sophia Antipolis Cedex; France, vol. RAN WG2, no. Beijing, china; Apr. 12, 2010, Apr. 28, 2010, XP050422824, [retrieved on Apr. 28, 2010].

International Search Report and Written Opinion—PCT/US2011/034566, ISA/EPO—Aug. 30, 2011.

Mitsubishi Electric: "EUTRAN Proxy in support of massive deployment of HNBs", 3GPP Draft; R3-080062 (HNB Proxy), 3rd Generation Partnership Project (3GPP), Mobile Competence Centre ; 650, Route Des Lucioles ; F-06921 Sophia-Antipolis Cedex ; France, vol. RAN WG3, no. Sorrento, Italy; Feb. 5, 2008, XP050163296, [retrieved on Feb. 5, 2008].

Qualcomm Incorporated: "ANR function and X2 management for Relay Nodes", 3GPP Draft; R3-101943, 3rd Generation Partnership Project (3GPP), Mobile Competence Centre ; 650, Route Des Lucioles; F-06921 Sophia-Antipolis Cedex; France, vol. RAN WG3, no. Beijing; Jun. 29, 2010, Jun. 23, 2010, XP050453854, [retrieved on Jun. 23, 2010].

\* cited by examiner

SYSTEM, APPARATUS AND METHOD FOR COORDINATING PEER COMMUNICATION IN WIRELESS SYSTEMS

CROSS-REFERENCE TO RELATED APPLICATION(S)

This application claims priority to and the benefit of U.S. Provisional Patent Application Ser. No. 61/330,246, entitled "X2 Setup for Child Evolved NodeB" and filed on Apr. 30, 2010, which is expressly incorporated by reference herein in its entirety.

BACKGROUND

1. Field

The present disclosure relates generally to communication systems, and more particularly, to coordinating peer communication in wireless systems.

2. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, single-carrier frequency divisional multiple access (SC-FDMA) systems, time division synchronous code division multiple access (TD-SCDMA) systems, Third Generation Partnership Project (3GPP) Long Term Evolution (LTE) systems, worldwide interoperability for microwave access (WiMAX), and various others.

Wireless multiple-access communication systems simultaneously support communication for multiple mobile devices. Each mobile device communicates with one or more base stations through transmission on forward and reverse links, wherein forward link (or downlink) refers to the communication link from base stations to mobile devices, and reverse link (or uplink) refers to the communication link from mobile devices to base stations. Communication links may be established through single-input-single-output (SISO) systems, multiple-input-single-output (MISO) systems, multiple-input-multiple-output (MIMO) systems, and so forth. In addition, mobile devices communicate with other mobile devices (and/or base stations with other base stations) in peer-to-peer (P2P) wireless network configurations.

For wireless communication systems, multiple-access technologies have been adopted in various telecommunication standards to provide a common protocol that enables different wireless devices to communicate on a municipal, national, regional, and even global level. An example of an emerging telecommunication standard is Long Term Evolution (LTE). LTE provides a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with an aspect of the disclosure, a method to facilitate wireless communication comprises providing a first peer connection with a first node, providing a second peer connection with a second node, and coordinating communication between the first and second nodes via the first and second peer connections.

In accordance with an aspect of the disclosure, a method to facilitate wireless communication comprises providing a first peer connection with a first node via X2 Proxy, providing a second peer connection with a second node via X2 Proxy, and coordinating X2 communication between the first and second nodes via the first and second peer connections.

In accordance with an aspect of the disclosure, an apparatus to facilitate wireless communication comprises a processing system configured to provide a first peer connection with a first node, provide a second peer connection with a second node, and coordinate communication between the first and second nodes via the first and second peer connections.

In accordance with an aspect of the disclosure, an apparatus to facilitate wireless communication comprises a processing system configured to provide a first peer connection with a first node via X2 Proxy, provide a second peer connection with a second node via X2 Proxy, and coordinate X2 communication between the first and second nodes via the first and second peer connections.

In accordance with an aspect of the disclosure, an apparatus to facilitate wireless communication comprises a means for providing a first peer connection with a first node, means for providing a second peer connection with a second node, and means for coordinating communication between the first and second nodes via the first and second peer connections.

In accordance with an aspect of the disclosure, an apparatus to facilitate wireless communication comprises a means for providing a first peer connection with a first node via X2 Proxy, means for providing a second peer connection with a second node via X2 Proxy, and means for coordinating X2 communication between the first and second nodes via the first and second peer connections.

In accordance with an aspect of the disclosure, a computer program product comprises a computer-readable medium comprising codes executable to cause an apparatus to provide a first peer connection with a first node, provide a second peer connection with a second node, and coordinate communication between the first and second nodes via the first and second peer connections.

In accordance with an aspect of the disclosure, a computer program product comprises a computer-readable medium comprising codes executable to cause an apparatus to provide a first peer connection with a first node via X2 Proxy, provide a second peer connection with a second node via X2 Proxy, and coordinate X2 communication between the first and second nodes via the first and second peer connections.

BRIEF DESCRIPTION OF THE DRAWINGS

The features, nature, and advantages of the disclosure will become more apparent from the detailed description set forth below when taken in conjunction with the drawings in which like reference characters identify correspondingly throughout.

DETAILED DESCRIPTION

Figure 1A:
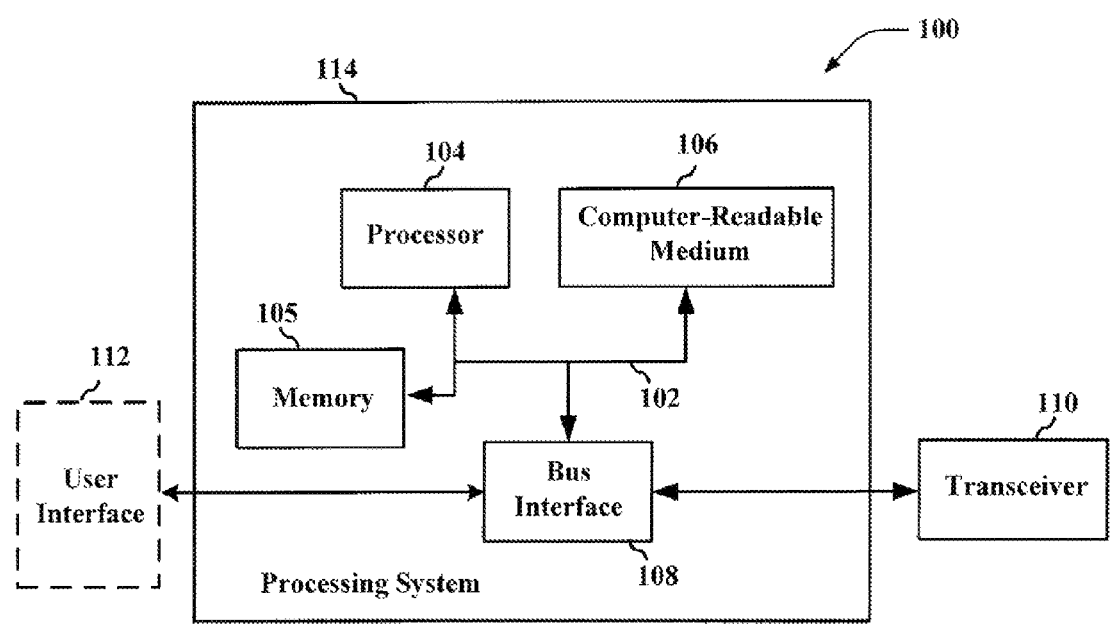
FIG. 1A is a diagram illustrating a hardware implementation for an apparatus employing a processing system, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (e.g., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the frequency subcarriers. Thus, OFDM may be utilized to combat inter-symbol interference (ISI) caused by frequency selective fading, which may be characterized by different amounts of attenuation across the system bandwidth.

FIG. 1A is a conceptual diagram illustrating an example of an implementation for an apparatus 100 employing a processing system 114 and a memory 105, in accordance with aspects of the disclosure. In an example, the processing system 114 may be implemented with a bus architecture, represented by a bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending on the nature of the apparatus 100, a user interface 112 (e.g., keypad, touchpad, monitor, display, speaker, microphone, joystick) may also be provided to interface with a user.

The processor 104 is configured for managing the bus 102 and general processing, including the execution of software stored on the computer-readable medium 106. The software, when executed by the processor 104, causes the processing system 114 to perform the various functions described herein for any particular apparatus. The computer-readable medium 106 may also be utilized for storing data that is manipulated by the processor 104 when executing software.

In accordance with aspects of the disclosure, the apparatus 100 may be configured to facilitate wireless communication in a peer-to-peer network. The apparatus 100 comprises the processing system 114 which may be configured to provide a first peer connection with a first node via X2 Proxy, provide a second peer connection with a second node via X2 Proxy, and coordinate X2 communication between the first and second nodes via the first and second peer connections. These and various other aspects of the disclosure are described in greater detail herein.

Figure 1B:
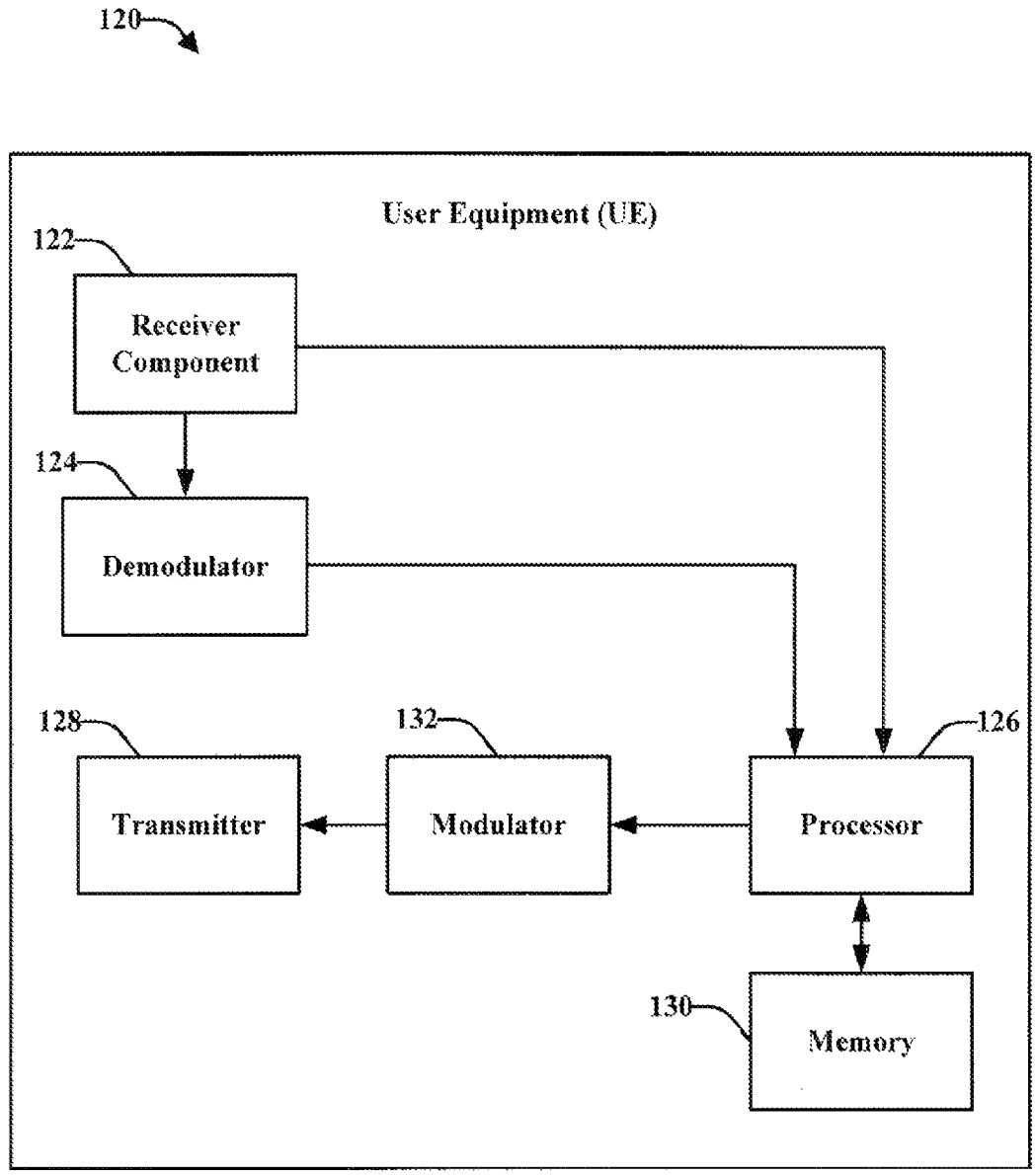
FIG. 1B is a diagram illustrating a system for facilitating X2 setup for an evolved NodeB (i.e., eNodeB or eNB), in accordance with aspects of the disclosure.

FIG. 1B is a conceptual diagram illustrating is a system 120 that facilitates X2 setup for a child evolved NodeB (i.e., eNodeB or eNB), in accordance with aspects of the disclosure. In an implementation, the system 120 may reside in user equipment (UE). The system 120 comprises a receiver component 122 that may receive a signal from, for example, a receiver antenna. The receiver component 122 may perform typical actions thereon, such as filtering, amplifying, down-converting, etc., on the received signal. The receiver component 122 may be configured to digitize the conditioned signal to obtain samples. A demodulator 124 may be configured to obtain received symbols for each symbol period and provide received symbols to a processor 126.

The processor 126 may be configured for analyzing information received by the receiver component 122 and/or generating information for transmission by a transmitter 128. The processor 126 may be configured to control one or more components of the system 120, analyze information received by the receiver component 122, generate information for transmission by the transmitter 128, and/or control one or more components of the system 120. The processor 126 may include a controller component configured for coordinating communications with additional UEs.

The system 120 may comprise memory 130 operatively coupled to the processor 126. The memory 130 may be configured to store information related to coordinating communications and any other suitable information. The memory 130 may be configured to store protocols associated with X2 interface management. The memory 130 of the various aspects is intended to comprise, without being limited to, these and any other suitable types of memory. The system 120 may comprise a symbol modulator 132, wherein the transmitter 128 transmits the modulated signal.

Figure 1C:
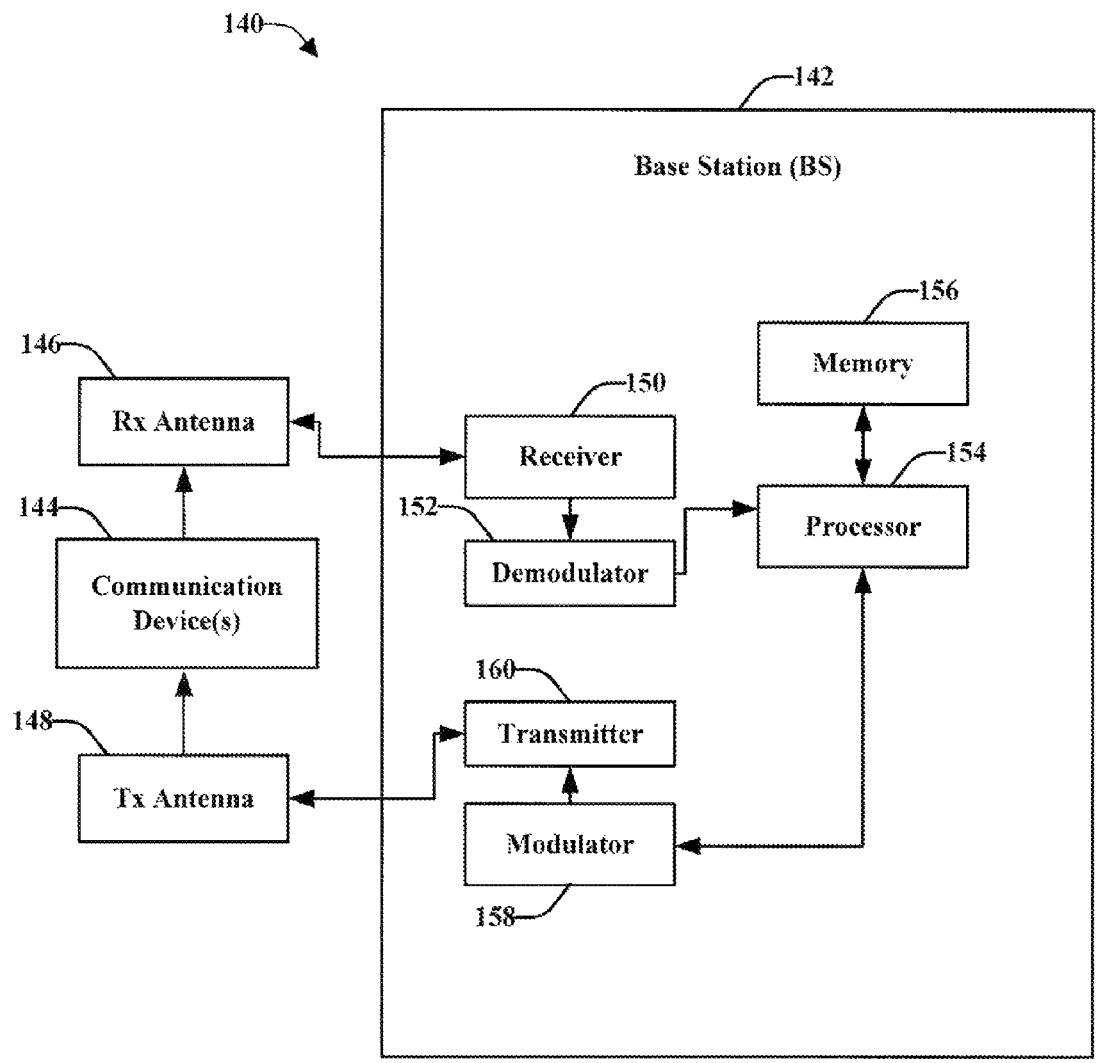
FIG. 1C is a diagram illustrating a system for facilitating X2 Proxy interface management, in accordance with aspects of the disclosure.

FIG. 1C is a diagram illustrating a system 140 configured to facilitate X2 interface management, in accordance with aspects of the disclosure. The system 140 may comprise an access point (AP) or base station (BS) 142. As shown, the base station 142 receives signal(s) from one or more communication devices 144 (e.g., UE) by a receive antenna 146, and transmits to the one or more communication devices 144 through a transmit antenna 148.

In an implementation, the base station 142 may comprise a receiver 150 that receives information from the receive antenna 146 and is operatively associated with a demodulator 152 that demodulates received information. Demodulated symbols are analyzed by a processor 154 that is coupled to a memory 156 that stores information related to X2 interface management. The base station may comprise a modulator 158 for multiplexing the signal for transmission by a transmitter 160 through the transmit antenna 148 to the one or more communication devices 144.

Figure 2:
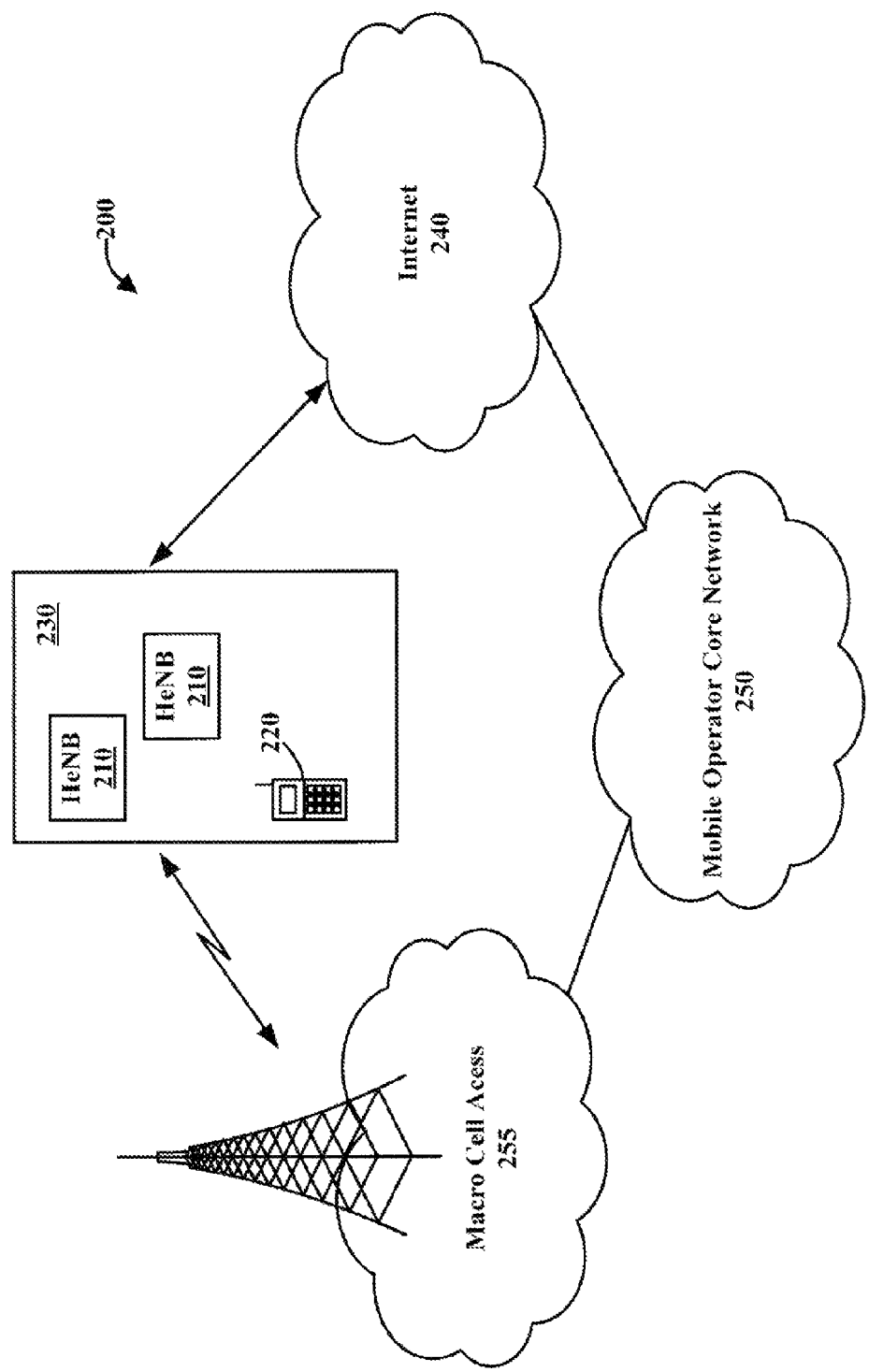
FIG. 2 is a diagram illustrating a wireless communication environment, in accordance with aspects of the disclosure.

FIG. 2 is a diagram illustrating a wireless communication environment 200, in accordance with aspects of the disclosure. The wireless communication environment 200 includes multiple access point BSs including Home eNodeBs (HeNBs) 210, each of which may be installed in corresponding small scale network environments, which may include user residences, places of business, indoor/outdoor facilities 230, and so forth. The HeNBs 210 may be configured to serve associated UEs 220 (e.g., included in a Closed Subscriber Group (CSG) associated with HeNBs 210), or optionally alien or visitor UEs 220 (e.g., that are not configured for the CSG of the HeNB 210). Each HeNB 210 is further coupled to the Internet 240 and a mobile operator core network 250 via a network interface, such as a DSL router, cable modem, broadband over power line connection, satellite Internet connection, or some other broadband Internet connection.

In an aspect of the disclosure, to implement wireless services via HeNBs 210, an owner of the HeNBs 210 subscribes to mobile service, such as 3G mobile services, offered through the mobile operator core network 250. The UE 220 may be configured to operate in a macro cellular environment and/or in a residential small scale network environment, utilizing various techniques described herein. As such, the HeNBs 210 may be backward compatible with any suitable existing UE 220. In addition to the macro cell mobile network 255, the UE 220 may be served by a predetermined number of HeNBs 210, such as HeNBs 210 that reside within a corresponding user residence(s), place(s) of business, or indoor/outdoor facilities 230, and may not be in a soft handover state with the macro cell mobile network 255 of the mobile operator core network 250. It should be appreciated that although aspects described herein employ 3GPP terminology, it is to be understood that the aspects may also be applied to 3GPP technology (Release 99 [Rel99], Rel5, Rel6, Rel7), as well as 3GPP2 technology (1×RTT, 1×EV-DO Rel0, RevA, RevB) and other known and related technologies.

Figure 3A:
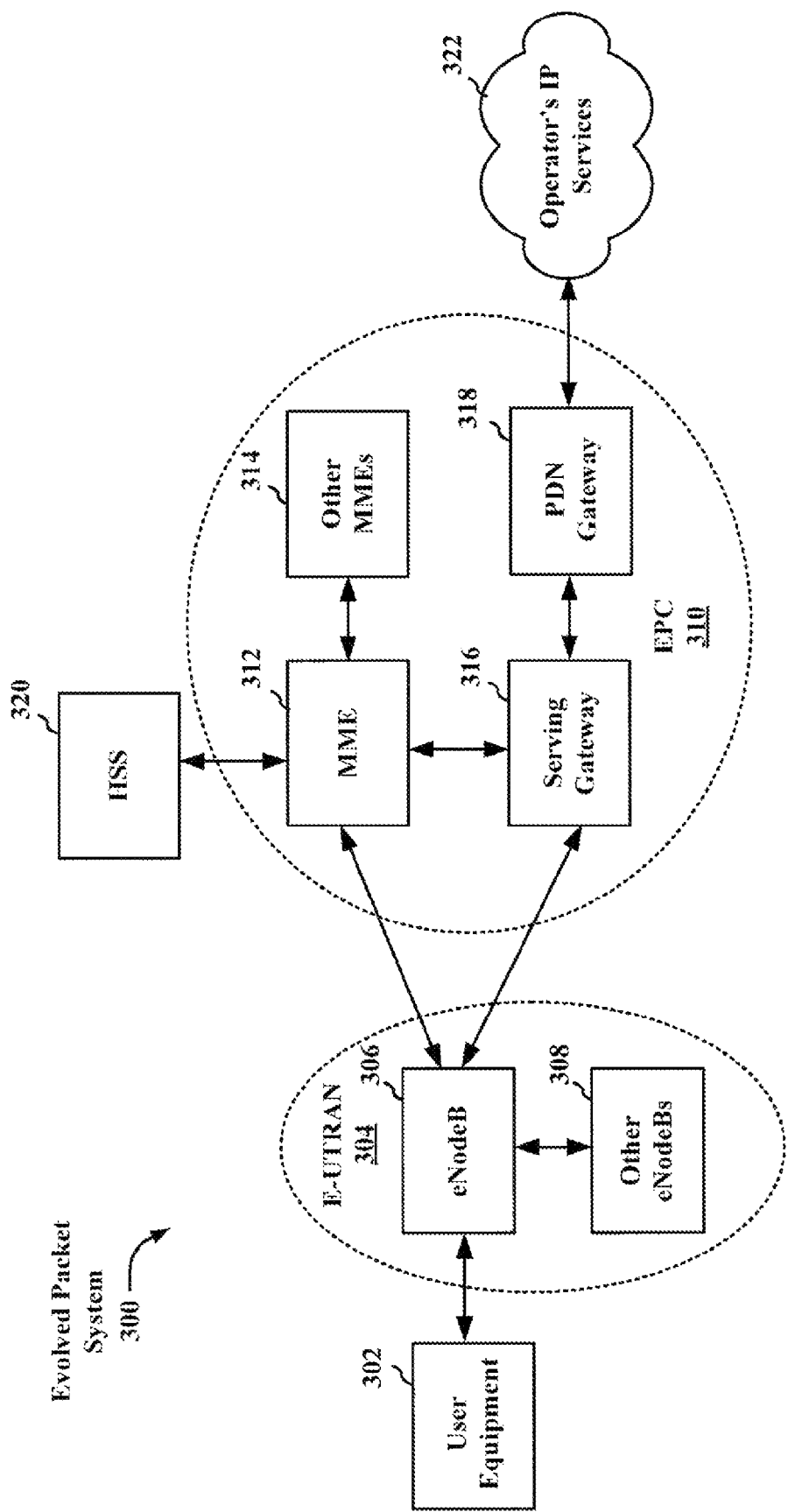
FIG. 3A is a diagram illustrating an example of a network architecture, in accordance with aspects of the disclosure.

FIG. 3A is a diagram illustrating an embodiment of a Long Term Evolution (LTE) network architecture 300, in accordance with aspects of the disclosure. The LTE network architecture 300 may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS may interconnect with other access networks, but for simplicity, those entities/interfaces are not shown. As shown in FIG. 3A, the EPS 300 provides packet-switched services. However, as those skilled in the art will readily appreciate, the various concepts presented throughout this disclosure may be extended to networks providing circuit-switched services. Further, it should be appreciated that each of the apparatuses and/or devices in the EPS 300 may each comprise the apparatus 100 of FIG. 1, without departing from the scope of the disclosure.

The E-UTRAN includes the evolved Node B (eNodeB) 306 and/or one or more other eNodeBs 308. The eNodeB 306 provides user and control plane protocol terminations toward the UE 302. The eNodeB 306 may be connected to one or more other eNodeBs 308 via an X2 interface (i.e., backhaul). The eNodeB 306 may be referred to by those skilled in the art as a base station, a base transceiver station, a radio base station, a radio transceiver, a transceiver function, a basic service set (BSS), an extended service set (ESS), or some other suitable terminology. The eNodeB 306 provides an access point to the EPC 310 for a UE 302. Examples of the UE 302 include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, or any other similar functioning device. The UE 302 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 306 is connected by an S1 interface to the EPC 310. The EPC 310 includes a Mobility Management Entity (MME) 312, other MMEs 314, a Serving Gateway 316, and a Packet Data Network (PDN) Gateway 318. The MME 312 is the control node that processes the signaling between the UE 302 and the EPC 310. The MME 312 is configured to provide bearer and connection management. User IP packets are transferred through the Serving Gateway 316, which itself is connected to the PDN Gateway 318. The PDN Gateway 318 provides UE Internet Protocol (IP) address allocation and/or other functions. The PDN Gateway 318 is connected to the Operator's IP Services 322. The Operator's IP Services 322 may include the Internet, an intranet, an IP Multimedia Subsystem (IMS), and a PS Streaming Service (PSS).

Figure 3B:
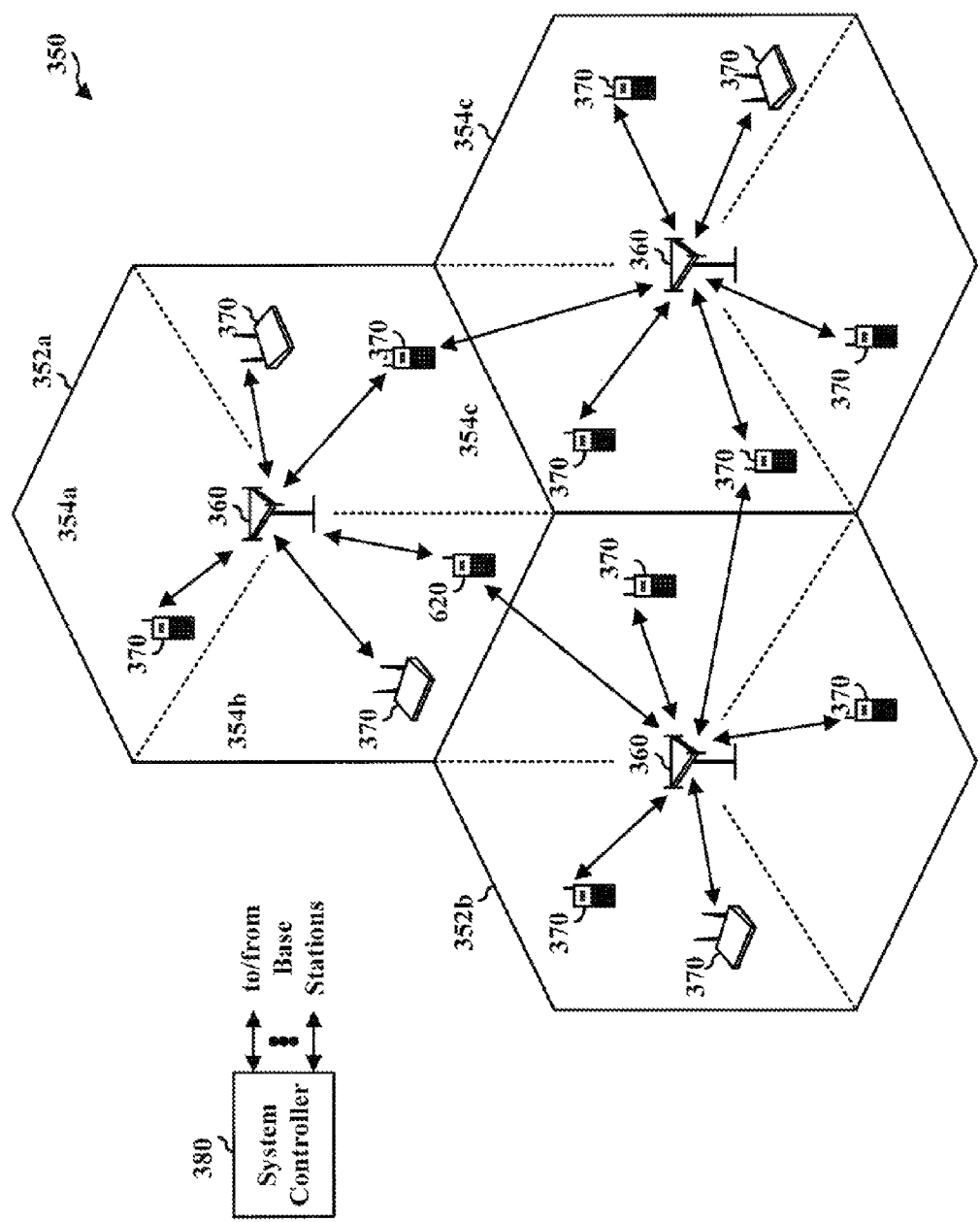
FIG. 3B is a diagram illustrating a wireless communication system, in accordance with aspects of the disclosure.

FIG. 3B illustrates a wireless communication system 350 with multiple base stations (BSs) 360 (e.g., wireless access points, wireless communication apparatus) and multiple terminals 370 (e.g., ATs), in accordance with aspects of the disclosure. At least one BS 360 may be a fixed station that communicates with the terminals and may be referred to as an access point (AP), a NodeB, an evolved NodeB (eNodeB), or some other terminology. Each BS 360 provides communication coverage for a particular geographic area or coverage area, illustrated, for example, as geographic areas in FIG. 8, labeled 352a, 352b, and 352c. The term "cell" may refer to a BS or its coverage area depending on the context in which the term is used. To improve system capacity, a BS geographic area/coverage area may be partitioned into multiple smaller areas 354a, 354b, and 354c (e.g., one or more smaller areas in cell 352a in FIG. 8). Each smaller area 354a, 354b, 354c may be served by a respective base transceiver subsystem (BTS). The term "sector" may refer to a BTS or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. In some aspects of the disclosure, the term "base station" may or may not refer to a fixed station that serves a sector as well as a fixed station that serves a cell.

In an implementation, one or more terminals 370 may be dispersed throughout the system 350, and each terminal 370 may be fixed or mobile. The terminals 370 may be referred to as a mobile apparatus, mobile station, user equipment (UE), user device, wireless communication apparatus, an access terminal (AT), a user terminal, or some other terminology. Each terminal 370 may comprise a wireless communication device, such as a cellular phone, a personal digital assistant (PDA), a wireless modem card, and so on. Each terminal 370 may communicate with zero, one, or multiple BSs 360 on the downlink (e.g., DL) and uplink (e.g., UL) at any given moment. The DL refers to a forward communication link from the base stations to the terminals, and the UL refers to a reverse communication link from the terminals to the base stations.

For a centralized architecture, a system controller 380 couples to the BSs 360 and provides coordination and control for the BSs 360. For a distributed architecture, the BSs 360 may communicate with one another as needed (e.g., by way of a wired or wireless backhaul network communicatively coupling the BSs 360). Data transmission on the DL may occur from one access point to one access terminal at or near the maximum data rate that may be supported by the DL of the system 350. Additional channels of the DL (e.g., control channel) may be transmitted from multiple access points to one access terminal. Data transmission on the UL may occur from one access terminal to one or more access points.

Figure 4:
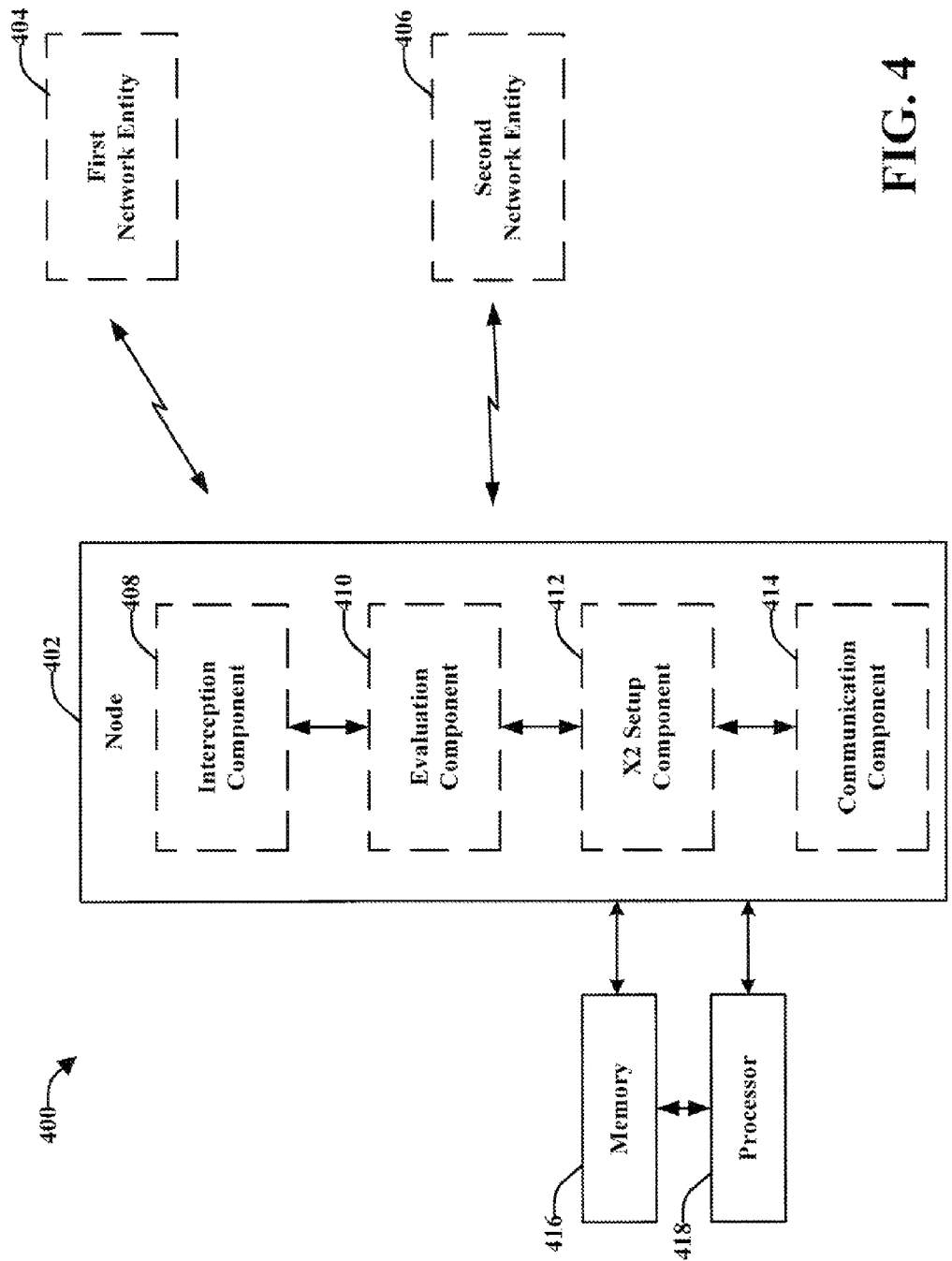
FIG. 4 is a diagram illustrating a system that performs an X2 setup for an eNodeB, in accordance with aspects of the disclosure.

FIG. 4 is a diagram that illustrates a system 400 configured to perform an X2 setup for a child eNodeB, in accordance with aspects of the disclosure. In an implementation, an X2 interface Application Protocol (X2AP) specifies services that an eNodeB offers to its neighbors. The X2AP comprises procedures that are used to handle User Equipment (UE) mobility within E-UTRAN (Evolved UMTS [Universal Mobile Telecommunications System] Terrestrial Radio Access Network) and procedures that are used to handle non-UE specific operations between at least two peer eNodeBs.

In an LTE network, according to an implementation, a Donor eNodeB (DeNodeB) may have child eNodeBs, such as ReNodeBs (Relay eNodeBs) and HeNodeBs (Home eNodeBs). Child eNodeBs may be served by backhaul links between child eNodeBs and the DeNodeB. A child eNodeB (child eNodeB or HeNodeB) may be configured to maintain an individual X2AP interface with each eNodeB of interest, including its DeNodeB and some other eNodeBs outside or external to its DeNodeB. The communication and operational overhead induced by these multiple X2 interfaces may be undesirable. In an implementation, X2 Proxy may be deployed at a DeNodeB (or external to the DeNodeB) to reduce a number of X2 interfaces handled by a child eNodeB. With a deployed X2 Proxy, a child eNodeB may be configured to maintain a single X2 interface towards the X2 Proxy, while all other eNodeBs external to the X2 Proxy appear to be cells under the X2 Proxy.

Before a child eNodeB establishes an X2 AP (X2 Application Protocol) communication channel with an external eNodeB, the child eNodeB may send an S1 message to its MME (Mobility Management Entity) to acquire the IP (Internet Protocol) address of the external eNodeB. However, when there is an X2 Proxy between the child eNodeB and the external eNodeB, the IP address of the external eNodeB from the child eNodeB's perspective may only be the IP address of the X2 Proxy. Thus, X2 interfaces may be established between the child eNodeB and the X2 Proxy and between the X2 Proxy and the external eNodeB. To support this operation, the system 400 is configured to provide an X2 setup procedure for child eNodeB when there is an X2 Proxy between the child eNodeB and the external eNodeB external to the X2 Proxy.

Referring to FIG. 4, the system 400 comprises a node 402, which may be a Donor eNodeB (i.e., DeNodeB or DeNB), in accordance with an aspect of the disclosure. The node 402 may be configured to communicate with a first network entity 404 and at least a second network entity 406. The first network entity 404 may comprise a child eNodeB and the second network entity 406 (or another network entity) may comprise a Mobility Management Entity (MME), a Target eNodeB, or some another network entity (or some other network node).

The node 402 may comprise an interception component 408 that is configured to intercept a request from the first network entity 404. The request may be sent from a child eNodeB (e.g., first network entity 404) and intended for the Mobility Management Entity (e.g. second network entity 406). The request may be received over a S1-AP and may be for an Internet Protocol address of a Cell Global Identity or a set of Cell Global Identities. An evaluation component 410 is configured to ascertain whether the Cell Global Identity or the set of Cell Global Identities belong to the node 402.

Depending on whether or not the Cell Global Identity or the set of Cell Global Identities belong to the node 402, an X2 setup component 412 is configured to selectively execute a nested X2 setup. For example, if the evaluation component 410 determines that the Cell Global Identity or the set of Cell Global Identities belongs to an external eNodeB (and not to node 402), then the X2 setup component 412 determines whether an X2 interface is established. If the X2 interface is established, then the X2 setup component 412 decides not to perform the nested X2 setup.

In an implementation, the evaluation component 410 may be configured to determine that the Cell Global Identity or the set of Cell Global Identities do not belong to the node 402. In this instance, the X2 setup component 412 may decide not to perform the nested X2 setup.

In an implementation, the evaluation component 410 may be configured to determine that the Cell Global Identity or the set of Cell Global Identities belong to an external eNodeB. In this instance, the X2 setup component 412 (or another component) may determine that a first X2 interface is not established, and the X2 setup component 412 (or another component) may forward the request to an MME. The X2 setup component 412 (or another component) may obtain an IP address of an external eNodeB and may establish a second X2 interface with the external eNodeB.

In an implementation, a communication component 414 may be configured to send to the first network entity 404 (e.g., child eNodeB) a response that includes the Internet Protocol (IP) address. The IP address may be an X2 Proxy Internet Protocol address.

The system 400 may include memory 416 operatively coupled to the node 402. The memory 416 may be external to the node 402 or may reside within the node 402. The memory 416 may retain instructions related to receiving from a child eNodeB a request for an Internet Protocol address of a Cell Global Identity or a set of Cell Global Identities and determining whether the Cell Global Identity or the set of Cell Global Identities belong to the wireless communications apparatus. The memory 416 may store instructions related to selectively executing a nested X2 setup and sending to the child eNodeB a response that includes the IP address.

In accordance with some aspects, the instructions related to receiving may comprise instructions related to intercepting the request, wherein the request was sent from the child eNodeB to an MME. The instructions related to sending may comprise instructions related to sending an X2 Proxy IP address. The instructions related to determining may comprise instructions related to determining the Cell Global Identity or the set of Cell Global Identities belong to an external eNodeB. The memory retains further instructions related to determining an X2 interface is established and deciding not to perform the nested X2 setup.

In accordance with some aspects, the instructions related to determining may comprise instructions related to determining the Cell Global Identity or the set of Cell Global Identities do not belong to the wireless communications apparatus and the set of instructions related to selectively executing comprise instructions related to deciding not to perform the nested X2 setup. The instructions related to determining may comprise instructions related to determining the Cell Global Identity or the set of Cell Global Identities belong to an external eNodeB. The memory 416 may be configured to retain instructions related to determining a first X2 interface is not established, forwarding the request to a mobility management entity, obtaining an IP address of an external eNodeB, and establishing a second X2 interface with the external eNodeB.

The memory 416 may be configured to store protocols associated with X2 setup management, taking action to control communication between node and other devices, etc., such that system 400 may employ stored protocols and/or algorithms to achieve improved communications in a wireless network as described herein. It should be appreciated that data store (e.g., memories) components described herein may be either volatile memory or nonvolatile memory, or may include both volatile and nonvolatile memory. By way of example and not limitation, nonvolatile memory may include read only memory (ROM), programmable ROM (PROM), electrically programmable ROM (EPROM), electrically erasable ROM (EEPROM), or flash memory. Volatile memory may include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 418 may be operatively connected to the node 402 (and/or the memory 416) to facilitate X2 setup management in a wireless communication network. The processor 418 may comprise a processor configured for analyzing and/or generating information received by the node 402, a processor configured for controlling one or more components of the system 400, and/or a processor configured for analyzing and generating information received by the node 402 and controlling the one or more components of the system 400.

In accordance with some aspects, the processor 418 may be configured to perform an X2 setup. The processor 418 may include a first module that is configured to intercept a request for an Internet Protocol address of a Cell Global Identity or a set of Cell Global Identities, wherein the request is sent from a child eNodeB. The processor 418 may include a second module that is configured to ascertain whether the Cell Global Identity or the set of Cell Global Identities is associated with the at least one processor 418. The processor 418 may include a third module that is configured to selectively execute a nested X2 setup and a fourth module that is configured to transmit to the child eNodeB a response that includes the IP address.

In accordance with some aspects, the processor 418 comprises a fifth module that is configured to determine that a first X2 interface is not established and a sixth module that is configured to forward the request to an MME. The processor 418 may comprise a seventh module that is configured to obtain an IP address of an external eNodeB and an eighth module that is configured to establish a second X2 interface with the external eNodeB.

In view of exemplary systems shown and described herein, methodologies that may be implemented in accordance with the disclosed subject matter, will be better appreciated with reference to various flow charts described herein. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein.

Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram, without departing from the scope of the disclosure.

Figure 5:
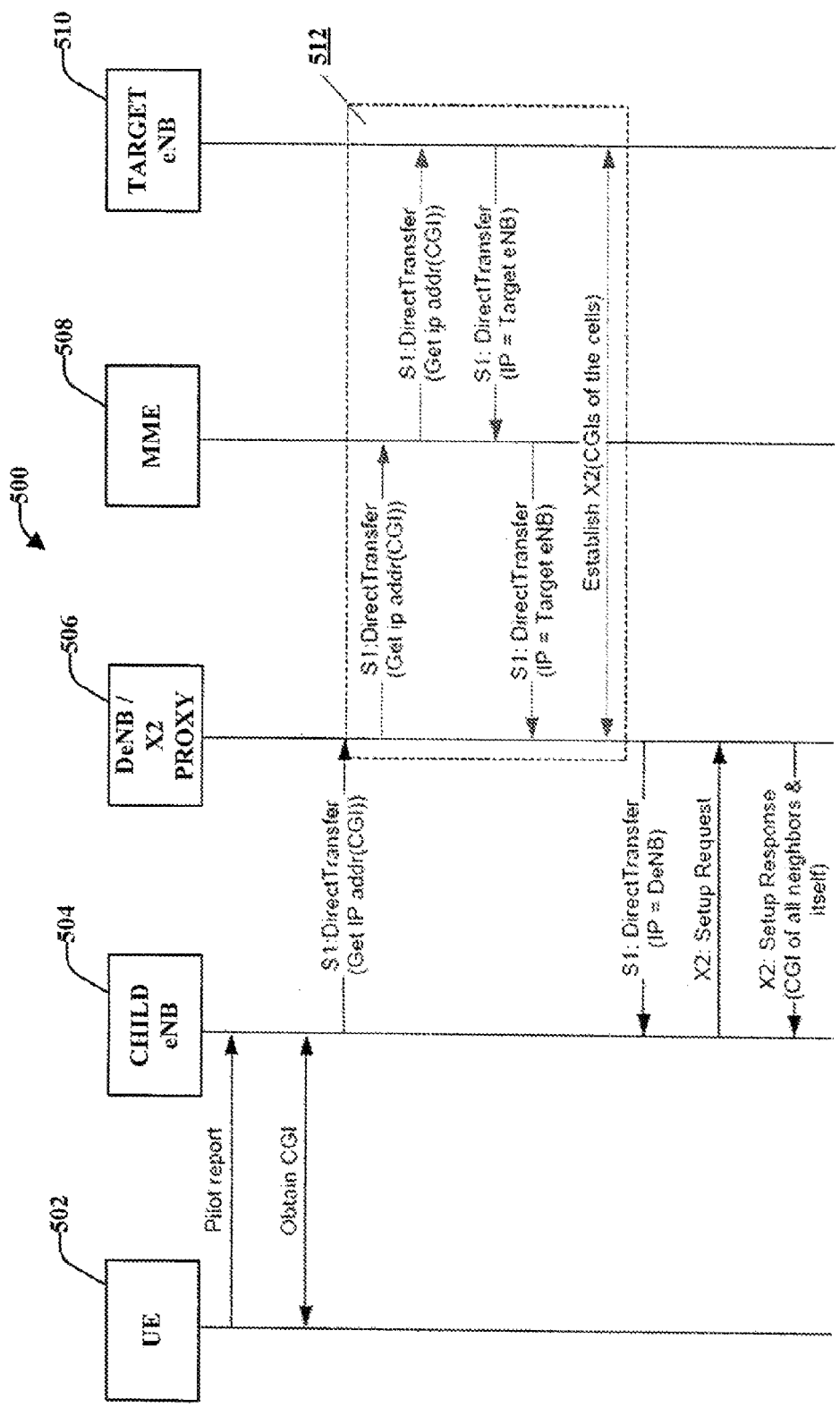
FIG. 5 is a diagram illustrating a procedure of an X2 setup for an eNodeB, in accordance with aspects of the disclosure.

FIG. 5 is a diagram illustrating a procedure 500 of an X2 Setup for a child eNodeB, in accordance with aspects of the disclosure. Represented by blocks are a User Equipment (UE) 502, a child eNodeB 504, a DeNodeB/X2 Proxy 506, an MME 508, and a Target eNodeB 510. When the child eNodeB 504 obtains a new (e.g., never before seen) CGI (Cell Global Identity) report by its UE 502, the child eNodeB 504 should establish an X2 communication channel with the new CGI or the new set of CGIs. In an example, the operations within a block 512 may be needed if the DeNodeB has not already established an X2 interface with Target eNodeB.

In an implementation, the procedure 500 may be implemented as follows.

operation 1: The child eNodeB 504 is configured to send a request to its MME 508 through an S1-AP interface to obtain an IP address of the new CGI and/or the IP address of the new set of CGIs.

operation 2: The DeNodeB 506 is configured to receive or intercept the request sent from the child eNodeB 504 and examine whether the CGIs belong to at least one external eNodeB (e.g., target eNodeB 510) or itself. In an example, if the CGIs do not belong to the DeNodeB 506, then the DeNodeB 506 sends back an S1-AP response to the child eNodeB 504 to indicate that the IP address of the CGIs is the X2 Proxy's IP.

In an implementation, if the CGI belongs to an external eNodeB, then the DeNodeB 506 is configured to examine whether an X2 interface is already established with the external eNodeB. If an X2 interface is already established between the external eNodeB and this DeNodeB 506, then the DeNodeB 506 is configured to send back an S1-AP response to the child eNodeB 504 to indicate that the IP address of the CGIs is the X2 Proxy's IP. If there is no such X2 interface, then the DeNodeB 506 is configured to execute a nested X2 setup between itself and the external eNodeB.

operation 3: The DeNodeB 506 is configured to forward the request through S1-AP to the child eNodeB's MME 508. The MME 508 is configured forward the request to the target external eNodeB 510. The external eNodeB 510 is configured send a response through S1-AP to the MME 508 to provide its IP address. The MME 508 is configured to forward the S1-AP response message to the DeNodeB 506.

operation 4: After the DeNodeB 508 obtains the IP address of the target external eNodeB 510, the DeNodeB is configured to establish an X2 interface with the external eNodeB 510 that has the target external eNodeB's IP address.

operation 5: After the X2 interface is established, the DeNodeB 506 is configured to send an S1-AP response message back to the child eNodeB 504 to indicate that the IP address of the target CGI is the X2 Proxy's IP.

operation 6: Once the child eNodeB 504 receives the IP address of its target cell from its perspective, the child eNodeB 504 is configured to send an X2 Setup Request through X2 AP to that IP address, which is the X2 Proxy's IP.

In an implementation, the procedure 500 of FIG. 5 comprises an X2 setup procedure for a child eNodeB when there is an X2 Proxy between the child eNodeB and an external eNodeB that is outside or external to the 2 proxy. In an example, a Donor eNodeB is configured to receive or intercept S1-AP messages from the child eNodeB.

Figure 6:
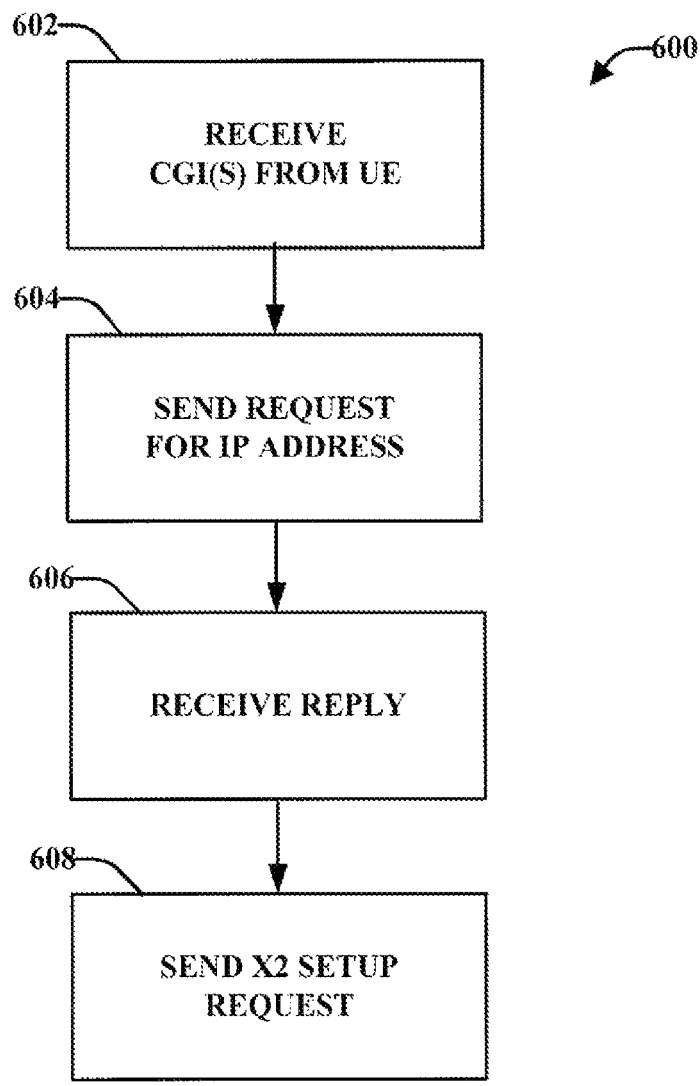
FIGS. 6 and 7 are diagrams illustrating various methods for X2 setup of an eNodeB, in accordance with aspects of the disclosure.

FIG. 6 is a diagram illustrating a method 600 for an X2 setup of a child eNodeB, in accordance with aspects of the disclosure. In an implementation, the method 600 may be performed by a child eNodeB. At 602, a CGI or a set of CGIs is/are received from a UE. The CGI or set of CGIs (hereinafter referred to simply as CGIs) may comprise new CGIs, which were not previously reported by the UE.

In an implementation, if the CGIs are new, at 604, a request is sent to an MME to obtain the IP address of the new CGIs. The request may be sent through an S1-AP interface. At 606, a reply is received to the request. In an example, the reply may indicate that the IP address of the CGIs is the X2 Proxy's IP if the CGIs do not belong to a DeNodeB that intercepted the request at 604. In an example, the reply received at 606 indicates that the IP address of the CGIs is the X2 Proxy's IP if there is an X2 interface already established between an external eNodeB and the DeNodeB that intercepted the request. In an example, the response received at 606 indicates that the IP address of the target CGI is the X2 Proxy's IP after an X2 interface is established.

In an implementation, at about the same time as receiving the reply (e.g., the IP address of the target cell) at 608, an X2 setup request is sent. The X2 setup request may be sent though X2 AP to the IP address of the target cell, which is the X2 Proxy's IP.

Figure 7:
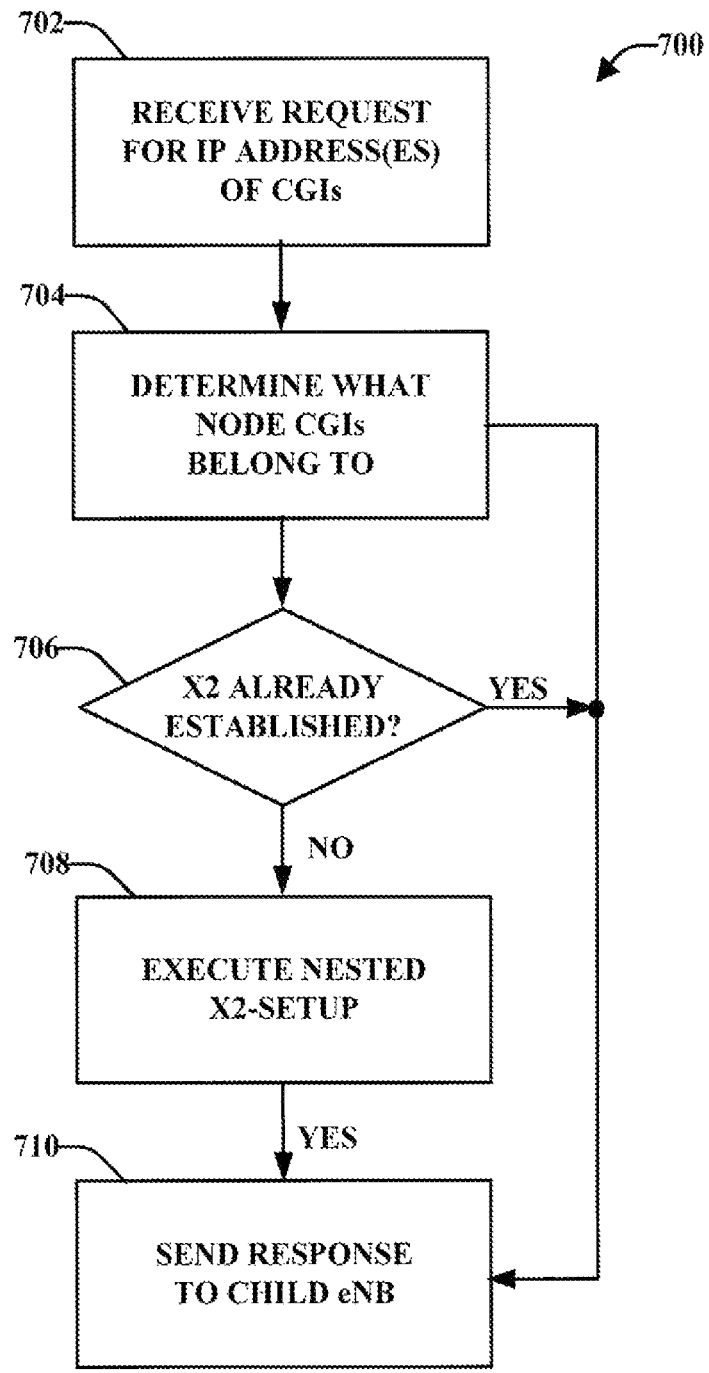

FIG. 7 is a diagram illustrating a method 700 for an X2 setup of a child eNodeB, in accordance with aspects of the disclosure. The method 700 may be performed by a node, such as a Donor NodeB (DeNodeB). At 702, a request for an Internet Protocol (IP) address of one or more CGIs is received from a child eNodeB. The request may be received through an S1-AP interface, wherein the child eNodeB sent the request to its MME and the DeNodeB intercepted the request.

At 704, a determination is made whether the CGIs belong to the DeNodeB or to an external eNodeB. At 706, if the CGIs do not belong to the DeNodeB, then a response is sent to the child eNodeB. The response indicates that the IP address of the CGIs is the IP of the X2 Proxy. The response may be a S1-AP response.

At 708, if the CGIs belong to an external eNodeB, then it may be ascertained whether an X2 interface is already established with the external eNodeB. If the X2 interface is already established between the external eNodeB and the DeNodeB ("YES"), the method 700 proceeds to 706, and a response is sent to the child eNodeB. The response may be a S1-AP response and may indicate that the IP address of the CGIs is the IP of the X2 Proxy.

At 708, if it is ascertained that the X2 interface has not been established ("NO"), then at 710, a nested X2 setup is selectively executed between the DeNodeB and the external eNodeB. In an example, the nested X2 setup is executed by forwarding the request to the child eNodeB's MME, which may be sent through S1-AP. The MME forwards the request to a target external eNodeB, which may reply to the MME with a response (through S1-AP) and inform the MME of the IP address of the external eNodeB. The MME forwards the S1-AP response message to the DeNodeB. At about the same time as receiving the IP address of the target external eNodeB, the DeNodeB may establish an X2 interface with the external eNodeB that has the target external eNodeB's IP address.

After the X2 interface is established, the method 700 continues, at 706, and a S1-AP response message is sent to the child eNodeB indicating that the IP address of the target CGI is the X2 Proxy's IP. After receiving the IP address, the child eNodeB sends an X2 Setup Request through X2 AP to the X2 Proxy's IP address.

In accordance with aspects of the disclosure, a computer program product may include a computer-readable medium that comprises codes for carrying out various aspects of the method 700. Computer-readable medium may include a first set of codes for causing a computer to obtain from a child eNodeB a request for an Internet Protocol address of a Cell Global Identity or a set of Cell Global Identities. Computer-readable medium may include a second set of codes for causing the computer to evaluate the Cell Global Identity or the set of Cell Global Identities and a third set of codes for causing the computer to selectively implement a nested X2 setup. Computer-readable medium may include a fourth set of codes for causing the computer to convey to the child eNodeB a response that includes the Internet Protocol address. Computer-readable medium may include a fifth set of codes for causing the computer to intercept the request, wherein the request was sent from the child eNodeB to a Mobility Management Entity (MME).

Figure 8:
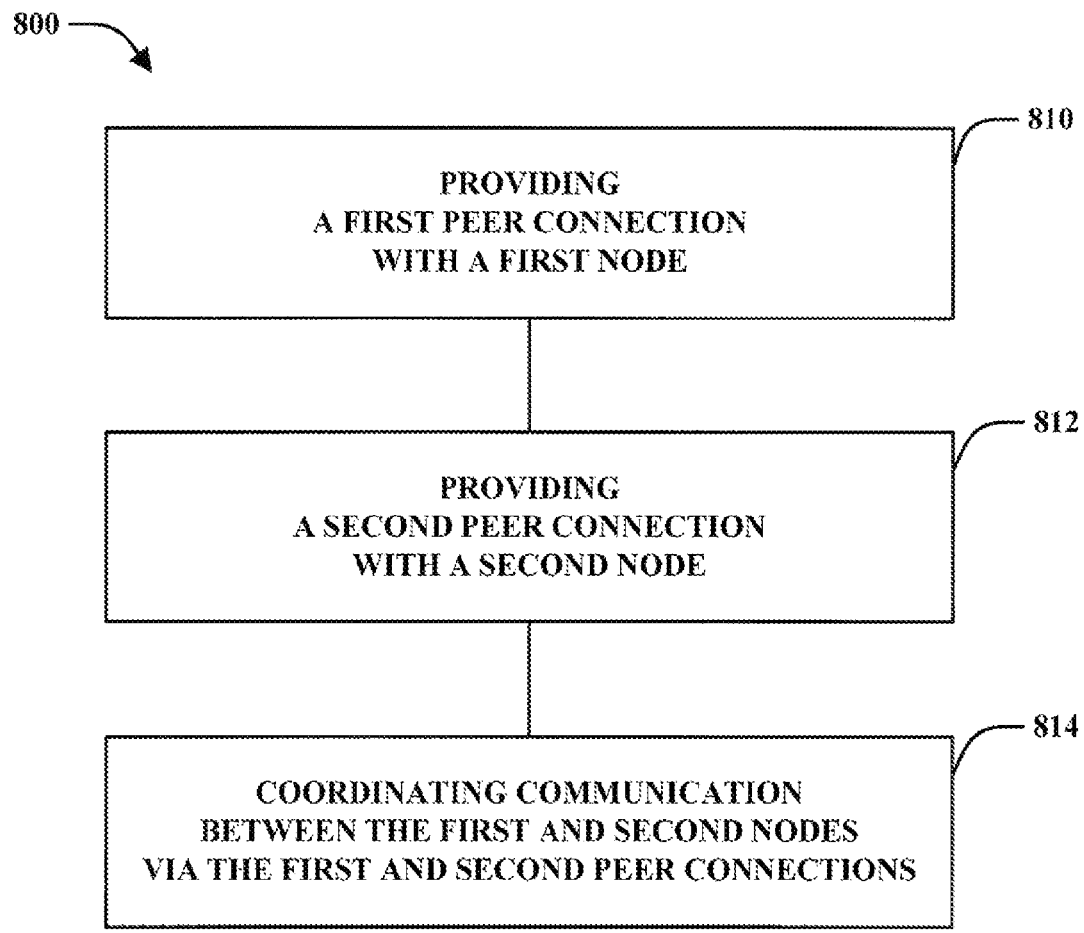
FIG. 8 is a flow diagram illustrating a methodology that facilitates wireless communication, in accordance with aspects of the disclosure.

FIG. 8 illustrates a flow diagram 800 of a method for facilitating wireless communication, in accordance with aspects of the disclosure. At 810, the method comprises providing a first peer connection with a first node. In an implementation, the method comprises providing the first peer connection with the first node via X2 Proxy. At 812, the method comprises providing a second peer connection with a second node. In an implementation, the method comprises providing the second peer connection with the second node via X2 Proxy. At 814, the method comprises coordinating communication between the first and second nodes via the first and second peer connections. In an implementation, the method comprises coordinating X2 communication between the first and second nodes via the first and second peer connections.

In an implementation, the method may further comprise receiving a request from the first node for a network address of the second node, acquiring the network address of the second node based on the request, and coordinating communication between the first and second nodes via the first and second peer connections based on the acquired network address of the second node. In an implementation, receiving the request may comprise intercepting the request between the first node and a Mobility Management Entity (MME). The request may comprise an S1 message requesting the network address of the second node, and the network address of the second node may comprise an Internet Protocol (IP) address of the second node.

In an implementation, the method may further comprise establishing the first peer connection with the first node via X2 Proxy, wherein the first peer connection may comprise a first X2 communication channel with the first node. The method may further comprise establishing the second peer connection with the second node via X2 Proxy, wherein the second peer connection may comprise a second X2 communication channel with the second node. The method may further comprise utilizing X2 interface Application Protocol to establish the first peer connection with the first node and utilizing X2 interface Application Protocol to establish the second peer connection with the second node. The first peer connection may comprise a first X2 interface for peer-to-peer communication with the first node, and the second peer connection may comprise a second X2 interface for peer-to-peer communication with the second node.

In an implementation, the method may be implemented by an eNodeB (e.g., child eNodeB or DeNB), and the first node may comprise a UE or a child eNodeB, the second node may comprise a neighboring UE or a neighboring eNodeB (e.g., another UE or another child eNodeB), and the first and second nodes are peers in a peer-to-peer communication network including, for example, an LTE communication network.

Figure 9:
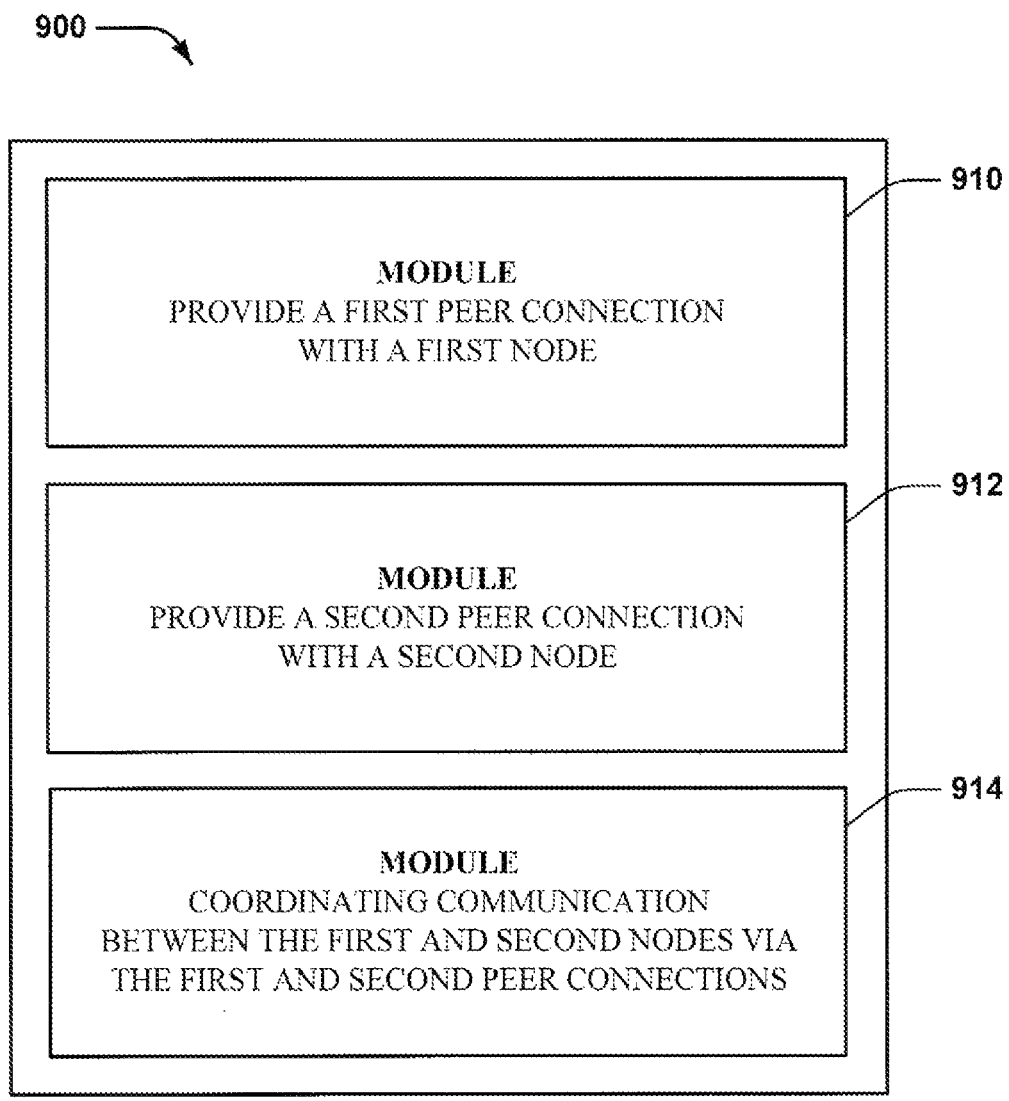
FIG. 9 is a conceptual diagram illustrating functionality of an apparatus, in accordance with aspects of the disclosure.

FIG. 9 is a block diagram 900 illustrating functionality of an apparatus configured to facilitate wireless communication, in accordance with aspects of the disclosure. The apparatus comprises a module 910 configured to provide a first peer connection with a first node, a module 912 configured to provide a second peer connection with a second node, and a module 914 configured to coordinate communication between the first and second nodes via the first and second peer connections. In an implementation, the module 910 is configured to provide a first peer connection with a first node via X2 Proxy, the module 912 is configured to provide a second peer connection with a second node via X2 Proxy, and the module 914 is configured to coordinate X2 communication between the first and second nodes via the first and second peer connections. The apparatus may include additional modules that perform each of the steps in the aforementioned flow charts. As such, each step in the aforementioned flow charts may be performed by a module, and the apparatus may include one or more of those modules.

In an implementation, the apparatus may further comprise a module configured for receiving a request from the first node for a network address of the second node, a module configured for acquiring the network address of the second node based on the request, and a module configured for coordinating communication between the first and second nodes via the first and second peer connections based on the acquired network address of the second node. In an implementation, the apparatus may further comprise a module configured for receiving the request may comprise intercepting the request between the first node and a Mobility Management Entity (MME). The request may comprise an S1 message requesting the network address of the second node, and the network address of the second node may comprise an Internet Protocol (IP) address of the second node.

In an implementation, the apparatus may further comprise a module configured for establishing the first peer connection with the first node via X2 Proxy, wherein the first peer connection may comprise a first X2 communication channel with the first node. The apparatus may further comprise a module configured for establishing the second peer connection with the second node via X2 Proxy, wherein the second peer connection may comprise a second X2 communication channel with the second node. The apparatus may further comprise a module configured for utilizing X2 interface Application Protocol to establish the first peer connection with the first node and a module configured for utilizing X2 interface Application Protocol to establish the second peer connection with the second node. The first peer connection may comprise a first X2 interface for peer-to-peer communication with the first node, and the second peer connection may comprise a second X2 interface for peer-to-peer communication with the second node.

In an implementation, the apparatus may comprise an eNodeB (e.g., child eNodeB or DeNB), and the first node may comprise a UE or a child eNodeB, the second node may comprise a neighboring UE or a neighboring eNodeB (e.g., another UE or another child eNodeB), and the first and second nodes are peers in a peer-to-peer communication network including, for example, an LTE communication network.

Referring to FIG. 1A, in a configuration, the apparatus 100 for wireless communication comprises the processing system 114 to provide a means for providing a first peer connection with a first node, a means for providing a second peer connection with a second node, and a means for coordinating communication between the first and second nodes via the first and second peer connections.

In an implementation, the apparatus 100 comprises the processing system 114 to provide a means for providing a first peer connection with a first node via X2 Proxy, a means for providing a second peer connection with a second node via X2 Proxy, and a means for coordinating X2 communication between the first and second nodes via the first and second peer connections.

Referring to FIG. 1B, in a configuration, the apparatus 120 for wireless communication comprises the processor 126 to provide a means for providing a first peer connection with a first node, a means for providing a second peer connection with a second node, and a means for coordinating communication between the first and second nodes via the first and second peer connections.

In an implementation, the apparatus 120 comprises the processor 126 to provide a means for providing a first peer connection with a first node via X2 Proxy, a means for providing a second peer connection with a second node via X2 Proxy, and a means for coordinating X2 communication between the first and second nodes via the first and second peer connections.

Referring to FIG. 1C, in a configuration, the apparatus 140 for wireless communication comprises the processor 154 to provide a means for providing a first peer connection with a first node, a means for providing a second peer connection with a second node, and a means for coordinating communication between the first and second nodes via the first and second peer connections.

In an implementation, the apparatus 140 comprises the processor 154 to provide a means for providing a first peer connection with a first node via X2 Proxy, a means for providing a second peer connection with a second node via X2 Proxy, and a means for coordinating X2 communication between the first and second nodes via the first and second peer connections.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

In an aspect of the subject disclosure, logical channels are classified into Control Channels and Traffic Channels. Logical Control Channels comprise: Broadcast Control Channel (BCCH), which is DL channel for broadcasting system control information. Paging Control Channel (PCCH), which is DL channel that transfers paging information. Multicast Control Channel (MCCH), which is Point-to-multipoint DL channel used for transmitting Multimedia Broadcast and Multicast Service (MBMS) scheduling and control information for one or several MTCHs. Generally, after establishing Radio Resource Control (RRC) connection, this channel is only used by UEs (User Equipments) that receive MBMS (Note: old MCCH+MSCH). Dedicated Control Channel (DCCH) is Point-to-point bi-directional channel that transmit dedicated control information and are used by user equipment having an RRC connection. Logical Traffic Channels comprise a Dedicated Traffic Channel (DTCH), which is Point-to-point bi-directional channel, dedicated to one user equipment, for the transfer of user information. Logical Traffic Channels also comprise, a Multicast Traffic Channel (MTCH) for Point-to-multipoint DL channel for transmitting traffic data.

Transport Channels are classified into DL Transport Channels and UL Transport Channels. DL Transport Channels comprise a Broadcast Channel (BCH), Downlink Shared Data Channel (DL-SDCH), and a Paging Channel (PCH). The PCH for support of user equipment power saving (DRX cycle is indicated by the network to the user equipment), broadcast over entire cell, and mapped to PHY resources which may be used for other control/traffic channels. The UL Transport Channels comprise a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH).

The UL PHY Channels comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Other terms relevant to the subject disclosure include: 3G Third Generation, 3GPP DRX Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, AP Application Protocol, ARQ Automatic repeat request, BCCH Broadcast control channel, BTS Base transceiver station, BW bandwidth, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, CRS Common Reference Signal, CSI Channel state information, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DM-RS Demodulation RS (also referred to as UE specific RS), DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNodeB (eNB), EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, P-GW Packet Data Network (PDN) Gateway, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PRB Physical Resource Block, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QoS Quality of Service, QCI, QoS Class Identifier, QPSK Quadrature phase shift keying, RACH Random access channel, RAT Radio access technology, RB Resource block, RE Resource Element, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, RTD Round Trip Delay, SAE System architecture evolution, SAP Service access point, SC-FDMA Single carrier frequency division multiple access, SDF Service Data Flow, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TEID Tunnel Endpoint Identifier, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access.

In accordance with aspects of the disclosure, it is to be understood that embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

In accordance with aspects of the disclosure, when implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. In various implementations, combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit may be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that may be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA may be utilized in uplink communications where lower PAPR may benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

For example, computer-readable media may include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein may represent one or more devices and/or other machine-readable media for storing information. The term "machine-readable medium" may include, without being limited to, wireless channels and various other media capable of storing, comprising, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor may read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects of the disclosure are intended to embrace all such alterations, modifications and variations that fall within scope of appended claims. Moreover, although various elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device may be referred to as, and may comprise some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and may be referred to as, and may comprise some or all of the functionality of, an access point, node, NodeB, eNodeB, eNB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. In various implementations, a combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method by a proxy node for wireless communication in a peer-to-peer network comprising a macro-cellular environment and a small-scale network environment, comprising:
providing, by the proxy node, a first peer connection with a first node in the small-scale environment via an X2 Proxy;
receiving, by the proxy node, a request from the first node for a network address of a second node;
forwarding, by the proxy node, the request from the first node to a Mobility Management Entity (MME), wherein the MME is configured to forward the request from the first node to the second node;

acquiring, by the proxy node, from the second node via the MME the network address of the second node based on the request;

providing, by the proxy node, a second peer connection in the macro-cellular environment with the second node via the X2 Proxy;

sending, by the proxy node, a response message to the first node, the response message including a network address of the proxy node as the network address of the second node; and coordinating, by the proxy node, X2 communication between the first and second nodes via the first and second peer connections based on the network address of the proxy node and the acquired network address of the second node; and wherein the providing the second peer connection with the second node comprises:

selectively performing, by the proxy node, a nested X2 setup between the proxy node and the second node when a cell identity at the proxy node belongs to the second node; and refraining, by the proxy node, from selectively performing the nested X2 setup when the cell identity at the proxy node belongs to the proxy node; and wherein the selectively performing the nested X2 setup comprises:

performing, by the proxy node, the nested X2 setup when the proxy node determines that an X2 interface with the second node is not established; and refraining, by the proxy node, from performing the nested X2 setup when the proxy node determines that the X2 interface with the second node is established.

2. The method of claim 1, wherein receiving the request comprises intercepting the request between the first node and the MME, wherein the request is sent from the first node to the MME and is sent to the MME being a destination for the request.

3. The method of claim 1, wherein the request comprises an S1 message requesting the network address of the second node, and the network address of the second node comprises an Internet Protocol address of the second node.

4. The method of claim 1, further comprising:
establishing the first peer connection with the first node via the X2 Proxy,
wherein the first peer connection comprises a first X2 communication channel with the first node.

5. The method of claim 1, further comprising:
establishing the second peer connection with the second node via the X2 Proxy,
wherein the second peer connection comprises a second X2 communication channel with the second node.

6. The method of claim 1, further comprising:
utilizing X2 interface Application Protocol to establish the first peer connection with the first node; and
utilizing X2 interface Application Protocol to establish the second peer connection with the second node.

7. The method of claim 1, wherein:
the first peer connection comprises a first X2 interface for peer-to-peer communication with the first node, and
the second peer connection comprises a second X2 interface for peer-to-peer communication with the second node.

8. The method of claim 1, wherein:
the first node comprises a first evolved NodeB device,
the second node comprises a second evolved NodeB device, and the X2 Proxy is deployed at the proxy node including a donor evolved NodeB or a third evolved NodeB.

9. The method of claim 1, wherein the first and second nodes are in a Long Term Evolution wireless communication network,
wherein providing the first peer connection includes providing a single X2 interface between the first node and the X2 Proxy, and wherein the first node is configured to communicate with a plurality of peer nodes using the single X2 interface between the first node and the X2 Proxy.

10. A proxy node in a peer-to-peer communication network comprising both a macro-cellular environment and a small-scale network environment, comprising:
a processor configured to:
provide a first peer connection with a first node in the small-scale network environment via an X2 Proxy;
receive a request from the first node for a network address of a second node;
forward, by the proxy node, the request from the first node to a Mobility Management Entity (MME), wherein the MME is configured to forward the request from the first node to the second node;
acquire from the second node via the MME the network address of the second node based on the request;
provide a second peer connection with a second node in the macro-cellular environment via the X2 Proxy; and
send a response message to the first node, the response message including a network address of the proxy node as the network address of the second node;
coordinate X2 communication between the first and second nodes via the first and second peer connections based on the network address of the proxy node and the acquired network address of the second node; and
wherein to provide the second peer connection with the second node, the processor is further configured to:
selectively perform, by the proxy node, a nested X2 setup between the proxy node and the second node when a cell identity at the proxy node belongs to the second node; and
refrain, by the proxy node, from selectively performing the nested X2 setup when the cell identity at the proxy node belongs to the proxy node; and
wherein to selectively perform the nested X2 setup, the processor is further configured to:
perform, by the proxy node, the nested X2 setup when the proxy node determines s that an X2 interface with the second node is not established; and
refrain, by the proxy node, from performing the nested X2 setup when the proxy node determines that the X2 interface with the second node is established.

11. The proxy node of claim 10, wherein receiving the request comprises intercepting the request between the first node and the MME, wherein the request is sent from the first node to the MME and is sent to the MME being a destination for the request.

12. The proxy node of claim 10, wherein the request comprises an S1 message requesting the network address of the second node, and the network address of the second node comprises an Internet Protocol address of the second node.

13. The proxy node of claim 10, wherein the processing system is further configured to:
establish the first peer connection with the first node via the X2 Proxy,
wherein the first peer connection comprises a first X2 communication channel with the first node.

14. The proxy node of claim 10, wherein the processing system is further configured to:
establish the second peer connection with the second node via the X2 Proxy,
wherein the second peer connection comprises a second X2 communication channel with the second node.

15. The proxy node of claim 10, wherein the processing system is further configured to:
utilize X2 interface Application Protocol to establish the first peer connection with the first node; and
utilize X2 interface Application Protocol to establish the second peer connection with the second node.

16. The proxy node of claim 10, wherein:
the first peer connection comprises a first X2 interface for peer-to-peer communication with the first node, and
the second peer connection comprises a second X2 interface for peer-to-peer communication with the second node.

17. The proxy node of claim 10, wherein:
the first node comprises a first evolved NodeB device,
the second node comprises a second evolved NodeB device, and
the X2 Proxy is deployed at the proxy node including a donor evolved NodeB or a third evolved NodeB.

18. The proxy node of claim 10, wherein the first and second nodes are in a Long Term Evolution wireless communication network, wherein the processing system is configured to provide a single X2 interface between the first node and the X2 Proxy, and wherein the first node is configured to communicate with a plurality of peer nodes using the single X2 interface between the first node and the X2 Proxy.

19. A proxy node in a peer-to-peer communication network comprising both a macro-cellular environment and a small-scale network environment, comprising:
means for providing a first peer connection with a first node in a small-scale network environment via an X2 Proxy;
means for receiving a request from the first node for a network address of a second node;
means for forwarding, by the proxy node, the request from the first node to a Mobility Management Entity (MME), wherein the MME is configured to forward the request from the first node to the second node;
means for acquiring from the second node via the MME the network address of the second node based on the request;
means for providing a second peer connection with a second node in a macro-cellular environment via the X2 Proxy;
means for sending a response message to the first node, the response message including a network address of the proxy node as the network address of the second node, and
means for coordinating X2 communication between the first and second nodes via the first and second peer connections based on the network address of the proxy node and the acquired network address of the second node; and
wherein the means for providing the second peer connection with the second node comprises:
means for selectively performing, by the proxy node, a nested X2 setup between the proxy node and the second node when a cell identity at the proxy node belongs to the second node; and
means for refraining, by the proxy node, from selectively performing the nested X2 setup when the cell identity at the proxy node belongs to the proxy node; and
wherein the means for selectively performing the nested X2 setup comprises:
means for performing, by the proxy node, the nested X2 setup when the proxy node determines that an X2 interface with the second node is not established; and
means for refraining, by the proxy node, from performing the nested X2 setup when the proxy node determines that the X2 interface with the second node is established.

20. The proxy node of claim 19, wherein the means for receiving the request comprises means for intercepting the request between the first node and the MME, wherein the request is sent from the first node to the MME and is sent to the MME being a destination for the request.

21. The proxy node of claim 19, wherein the request comprises an S1 message requesting the network address of the second node, and the network address of the second node comprises an Internet Protocol address of the second node.

22. The proxy node of claim 19, further comprising:
means for establishing the first peer connection with the first node via the X2 Proxy,
wherein the first peer connection comprises a first X2 communication channel with the first node.

23. The proxy node of claim 19, further comprising:
means for establishing the second peer connection with the second node via the X2 Proxy,
wherein the second peer connection comprises a second X2 communication channel with the second node.

24. The proxy node of claim 19, further comprising:
means for utilizing X2 interface Application Protocol to establish the first peer connection with the first node; and
means for utilizing X2 interface Application Protocol to establish the second peer connection with the second node.

25. The proxy node of claim 19, wherein:
the first peer connection comprises a first X2 interface for peer-to-peer communication with the first node, and
the second peer connection comprises a second X2 interface for peer-to-peer communication with the second node.

26. The proxy node of claim 19, wherein:
the first node comprises a first evolved NodeB device,
the second node comprises a second evolved NodeB device, and
the X2 Proxy is deployed at the proxy node including a donor evolved NodeB or a third evolved NodeB.

27. The proxy node of claim 19, wherein the first and second nodes are in a Long Term Evolution wireless communication network, wherein the means for providing the first peer connection provides a single X2 interface between the first node and the X2 Proxy, and wherein the first node is configured to communicate with a plurality of peer nodes using the single X2 interface between the first node and the X2 Proxy.

28. A computer program product for a proxy node in a peer-to-peer communication network comprising both a macro-cellular environment and a small-scale network environment, comprising:
a non-transitory computer-readable medium comprising codes executable to cause the proxy node to:
provide a first peer connection with a first node in the small-scale network environment via an X2 Proxy;
receive a request from the first node for a network address of a second node;
forward, by the proxy node, the request from the first node to a Mobility Management Entity (MME), wherein the MME is configured to forward the request from the first node to the second node;

acquire from the second node via the MME the network address of the second node based on the request;

provide a second peer connection with a second node in the macro-cellular environment via the X2 Proxy;

send a response message to the first node, the response message including a network address of the proxy node as the network address of the second node; and coordinate X2 communication between the first and second nodes via the first and second peer connections based on the network address of the proxy node and the acquired network address of the second node; and wherein the codes to provide the second peer connection with the second node comprises codes to:

selectively perform, by the proxy node, a nested X2 setup between the proxy node and the second node when a cell identity at the proxy node belongs to the second node; and refrain, by the proxy node, from selectively performing the nested X2 setup when the cell identity at the proxy node belongs to the proxy node; and wherein the codes to selectively perform the nested X2 setup comprises codes to:

perform, by the proxy node, the nested X2 setup when the proxy node determines that an X2 interface with the second node is not established; and refrain, by the proxy node, from performing the nested X2 setup when the proxy node determines that the X2 interface with the second node is established.

29. The computer program product of claim 28, wherein receiving the request comprises intercepting the request between the first node and the MME, wherein the request is sent from the first node to the MME and is sent to the MME being a destination for the request.

30. The computer program product of claim 28, wherein the request comprises an S1 message requesting the network address of the second node, and the network address of the second node comprises an Internet Protocol address of the second node.

31. The computer program product of claim 28, wherein the computer-readable medium further comprises codes executable to cause the proxy node to:

establish the first peer connection with the first node via the X2 Proxy, wherein the first peer connection comprises a first X2 communication channel with the first node.

32. The computer program product of claim 28, wherein the computer-readable medium further comprises codes executable to cause the proxy node to:

establish the second peer connection with the second node via the X2 Proxy, wherein the second peer connection comprises a second X2 communication channel with the second node.

33. The computer program product of claim 28, wherein the computer-readable medium further comprises codes executable to cause the proxy node to:

utilize X2 interface Application Protocol to establish the first peer connection with the first node; and utilize X2 interface Application Protocol to establish the second peer connection with the second node.

34. The computer program product of claim 28, wherein:

the first peer connection comprises a first X2 interface for peer-to-peer communication with the first node, and the second peer connection comprises a second X2 interface for peer-to-peer communication with the second node.

35. The computer program product of claim 28, wherein:

the first node comprises a first evolved NodeB device, the second node comprises a second evolved NodeB device, and the X2 Proxy is deployed at the proxy node including a donor evolved NodeB or a third evolved NodeB.

36. The computer program product of claim 28, wherein the first and second nodes are in a Long Term Evolution wireless communication network, wherein the computer-readable medium comprises codes executable to cause the proxy node to provide a single X2 interface between the first node and the X2 Proxy, and wherein the first node is configured to communicate with a plurality of peer nodes using the single X2 interface between the first node and the X2 Proxy.

* * * * *